(12) United States Patent  (10) Patent No.: US 7,997,302 B2
Henderson et al.  (45) Date of Patent: Aug. 16, 2011

(54) VALVE AND ASSOCIATED SYSTEM AND METHOD

(75) Inventors: Tyler C. Henderson, Peoria, IL (US); David A. Lucas, Metamora, IL (US); Jason Stibs, Marquette Heights, IL (US)

(73) Assignee: Caterpillar Inc., Peoria, IL (US)

( * ) Notice: Subject to any disclaimer, the term of this patent is extended or adjusted under 35 U.S.C. 154(b) by 765 days.

(21) Appl. No.: 11/961,214

(22) Filed: Dec. 20, 2007

(65) Prior Publication Data

US 2009/0159142 A1 Jun. 25, 2009

(51) Int. Cl.
*F16K 11/078* (2006.01)
*F16K 31/02* (2006.01)
*B60S 1/46* (2006.01)

(52) U.S. Cl. ............... 137/625.17; 251/65; 251/129.09; 239/284.1

(58) Field of Classification Search ............. 137/625.17; 251/65, 129.09; 239/284.1, 284.2; 15/250.02
See application file for complete search history.

(56) References Cited

U.S. PATENT DOCUMENTS

| | | | |
|---|---|---|---|
| 2,834,376 A * | 5/1958 | Hughes | 137/625.17 |
| 3,286,932 A | 11/1966 | Kibler | |
| 3,469,606 A | 9/1969 | Getman | |
| 3,677,362 A | 7/1972 | Chatterjea | |
| 3,882,883 A | 5/1975 | Droegemueller | |
| 3,902,217 A | 9/1975 | Botz et al. | |
| 4,191,213 A * | 3/1980 | Dolling et al. | 137/625.17 |
| 4,312,372 A | 1/1982 | Amos et al. | |
| 4,649,970 A | 3/1987 | Bower et al. | |
| 4,679,983 A | 7/1987 | Pietryk et al. | |
| 5,358,213 A * | 10/1994 | Pilolla | 137/625.17 |
| 5,405,585 A | 4/1995 | Coassin | |
| 5,524,822 A * | 6/1996 | Simmons | 137/625.17 |
| 5,984,644 A | 11/1999 | Yu | |
| 6,206,342 B1 * | 3/2001 | Beck | 137/625.17 |
| 6,672,336 B2 | 1/2004 | Nichols | |
| 6,896,199 B2 * | 5/2005 | Bissonnette | 239/284.1 |
| 7,273,068 B2 * | 9/2007 | Ballenger et al. | 137/625.17 |
| 2003/0222156 A1 | 12/2003 | Bissonnette | |

* cited by examiner

*Primary Examiner* — John Rivell
(74) *Attorney, Agent, or Firm* — James Derel Monteith (57) ABSTRACT

A valve is disclosed that includes a valve body defining an inlet and a plurality of outlets, the inlet and the plurality of outlets cooperating to form a plurality of alternative fluid flow paths through the valve body. The valve further includes an outlet selection member carried by the valve body and defining a port configured to complete a fluid flow path selected from the plurality of alternative fluid flow paths. The valve further includes a first magnet assembly configured to enable reciprocation of the outlet selection member and a second magnet assembly configured to enable rotation of the outlet selection member. A washer fluid supply system incorporating the valve and a method of operating the valve are also disclosed.

20 Claims, 5 Drawing Sheets

VALVE AND ASSOCIATED SYSTEM AND METHOD

TECHNICAL FIELD

This invention generally relates to a valve that enables fluid flowing into an inlet defined by the valve to be directed to an outlet selected from a plurality of outlets defined by the valve, a washer fluid supply system associated with such a valve, and a method of operating such a valve.

BACKGROUND

Single-inlet, multiple-outlet valves with simplified, efficient designs that allow precise selection of any one of a plurality of alternative fluid flow paths are scarce in the prior art, particularly in washer fluid supply systems such as those utilized on motor vehicles having multiple surfaces that require periodic mechanized washing initiated by an operator.

Some prior art valves employ designs that rely on fluid pressure for valve actuation, cause undue valve wear, or give rise to other inefficiencies. For instance, U.S. Patent Application Publication No. US 2003/0222156 A1 to Bissonnette ("Bissonnette") discloses a washing apparatus for multiple vehicle surfaces that includes a valve system to enable operator selection of the vehicle surface to be washed. However, the alternative valve systems disclosed in Bissonnette are either pressure responsive or include multiple valves. The pressure responsive valve system and associated components disclosed in Bissonnette may cease to operate effectively as fluid supply diminishes and may wear quickly as a result of being actuated by fluid pressure. The alternative valve system disclosed in Bissonnette that includes multiple valves and associated components unduly increases the cost and complexity of system assembly and maintenance.

SUMMARY

A valve is disclosed that includes a valve body defining an inlet and a plurality of outlets, the inlet and the plurality of outlets cooperating to form a plurality of alternative fluid flow paths through the valve body. The valve further includes an outlet selection member carried by the valve body and defining a port configured to complete a fluid flow path selected from the plurality of alternative fluid flow paths. The valve further includes a first magnet assembly configured to enable reciprocation of the outlet selection member and a second magnet assembly configured to enable rotation of the outlet selection member.

A washer fluid supply system in a machine including an operator cabin and a plurality of work surfaces is disclosed. The washer fluid supply system includes a washer switch within the operator cabin, the washer switch associated with one of the plurality of work surfaces. The washer fluid supply system further includes a reservoir of washer fluid, a pump for pumping washer fluid from the reservoir, and a valve for directing the washer fluid from the pump to the work surface associated with the washer switch. The valve includes a valve body defining an inlet and a plurality of outlets, the inlet and the plurality of outlets cooperating to form a plurality of alternative fluid flow paths through the valve body. The valve further includes an outlet selection member carried by the valve body and defining a port configured to complete a fluid flow path selected from the plurality of alternative fluid flow paths. The valve further includes a first magnet assembly configured to enable reciprocation of the outlet selection member and a second magnet assembly configured to enable rotation of the outlet selection member.

A method is disclosed for operating a valve to direct fluid flow from an inlet defined by the valve to an outlet selected from a plurality of outlets defined by the valve. The method includes the step of providing a valve that includes a valve body defining an inlet and a plurality of outlets, the inlet and the plurality of outlets cooperating to form a plurality of alternative fluid flow paths through the valve body. The provided valve further includes an outlet selection member carried by the valve body and defining a port configured to complete a fluid flow path selected from the plurality of alternative fluid flow paths. The provided valve further includes a first magnet assembly configured to enable reciprocation of the outlet selection member and a second magnet assembly configured to enable rotation of the outlet selection member. The method further includes the step of activating at least one of the first magnet assembly and the second magnet assembly to position the outlet selection member such that the port defined by the outlet selection member completes the selected fluid flow path.

DETAILED DESCRIPTION

Figure 1:
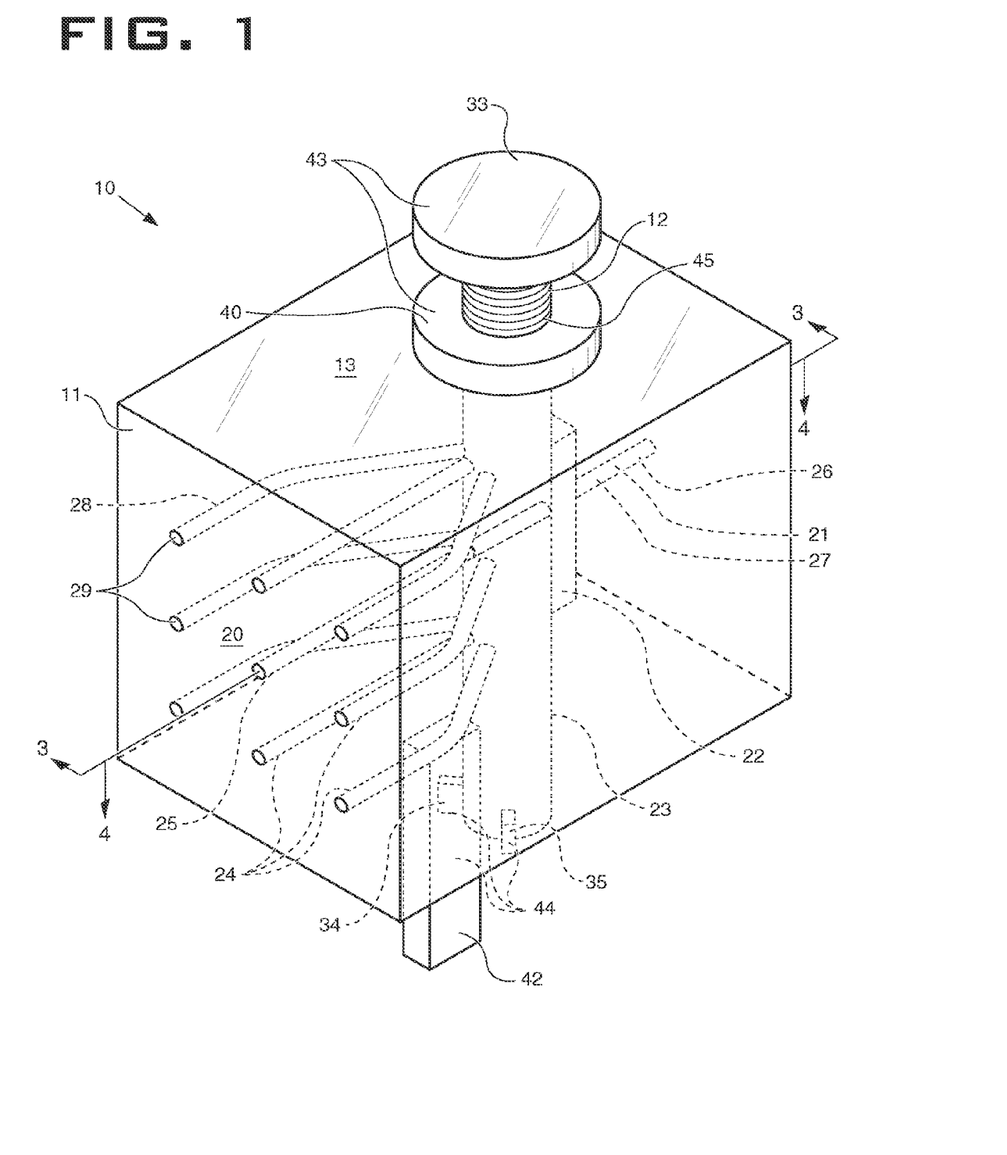
FIG. 1 is a perspective view of a valve according to an embodiment of the invention.
Figure 3:
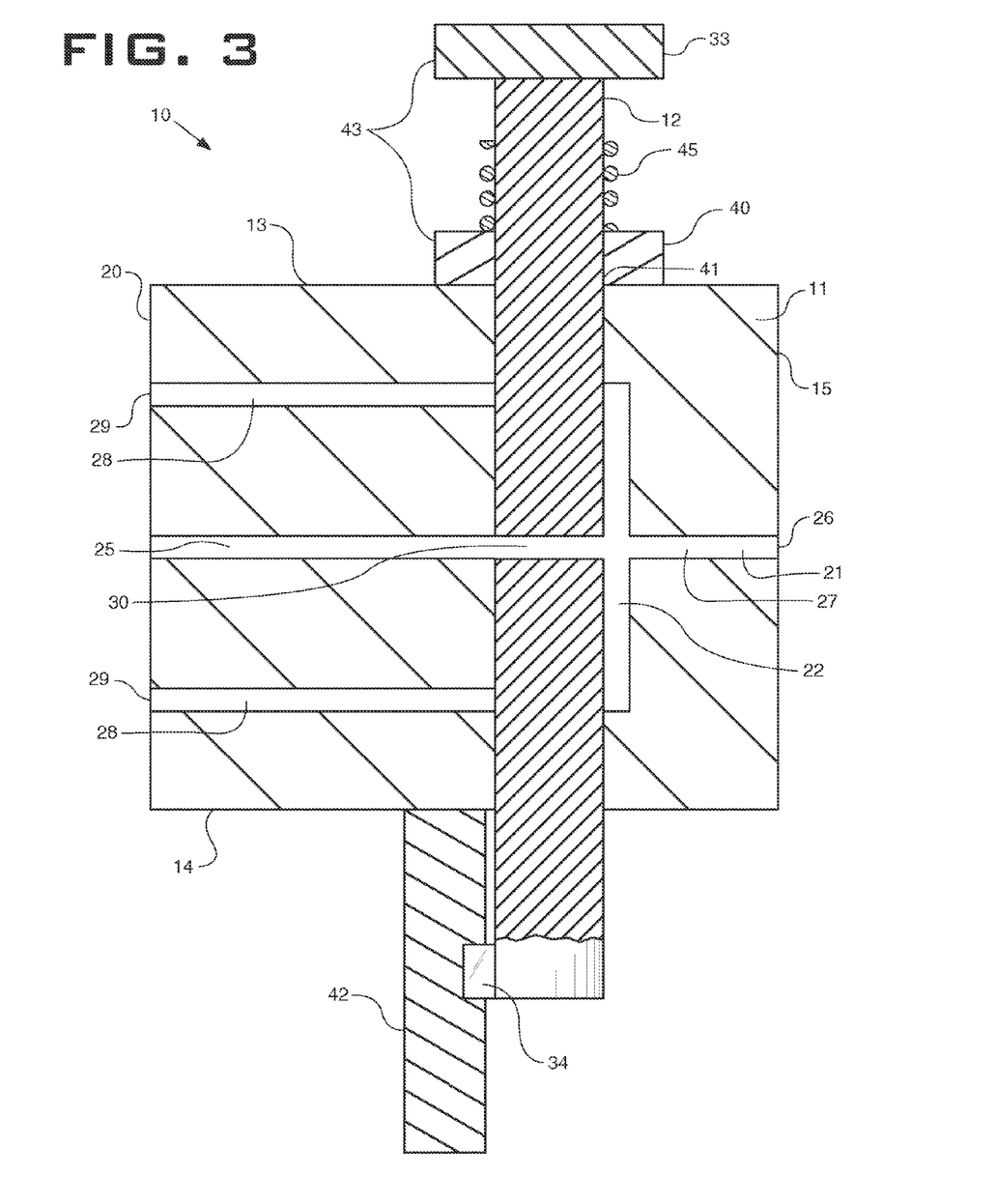
FIG. 3 is a cross-sectional view of the valve shown in FIG. 1, taken through line 3-3 of FIG. 1.
Figure 4:
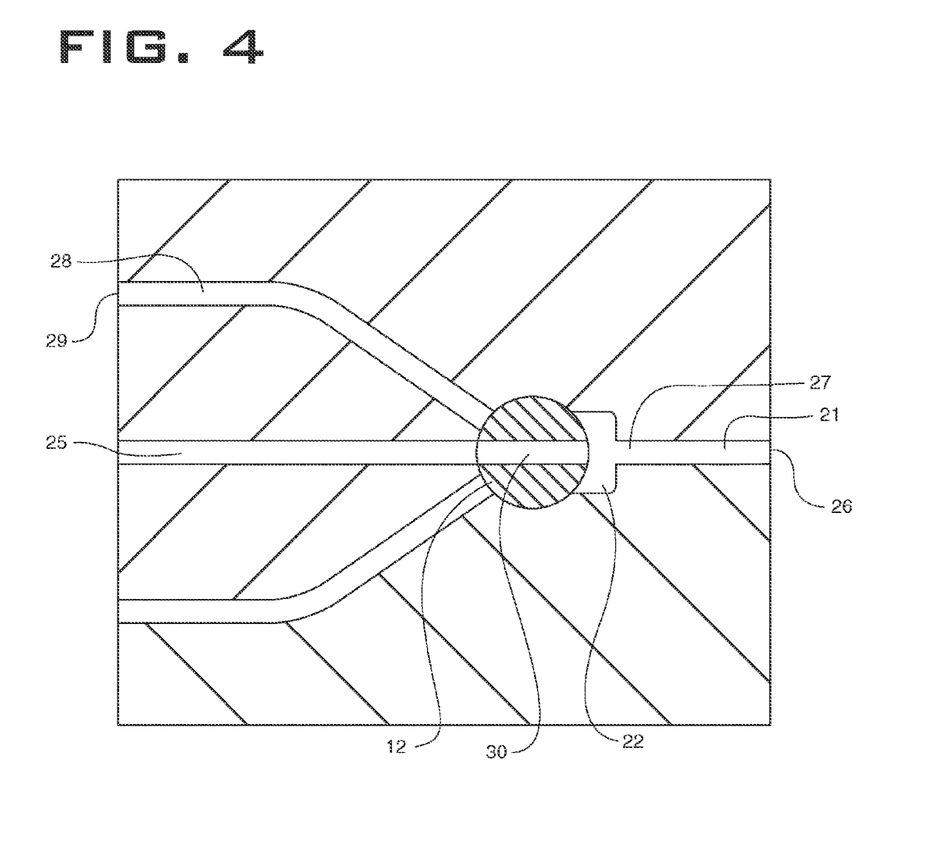
FIG. 4 is a cross-sectional view of the valve shown in FIG. 1, taken through line 4-4 of FIG. 1.

A valve according to an embodiment of the invention is shown broadly in FIG. 1 at reference numeral 10. The valve 10 includes a valve body 11 and an outlet selection member 12. In the disclosed embodiment, the valve body 11 is substantially rectangular and includes a top surface 13, a bottom surface 14 (FIG. 3) opposite the top surface 13, an inlet surface 15 (FIG. 3), and an outlet surface 20 opposite the inlet surface 15. As shown in FIGS. 1, 3, and 4, the valve body 11 defines an inlet 21 having a longitudinal axis, an inlet chamber 22, an outlet selection bore 23 for receiving the outlet selection member 12, and a plurality of outlets 24 including a default outlet 25. The outlet selection bore 23 has a longitudinal axis substantially perpendicular to the longitudinal axis of the inlet 21. The inlet 21 comprises an inlet port 26 and an inlet channel 27 downstream from the inlet port 26, and each of the outlets in the plurality of outlets 24 comprises an outlet channel 28 and an outlet port 29 downstream from the outlet channel 28.

Figure 2:
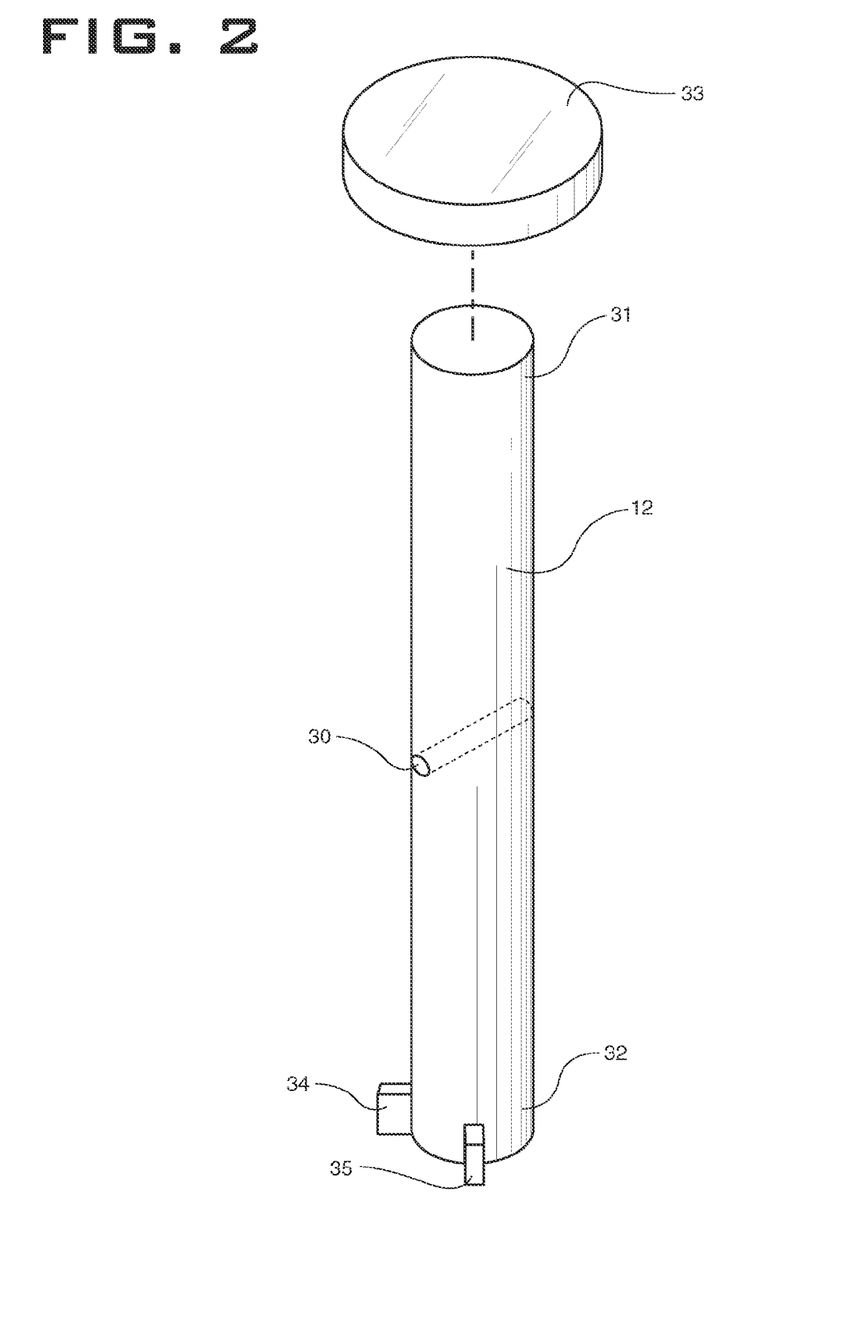
FIG. 2 is an exploded view of the outlet selection member of the valve shown in FIG. 1.

Turning now to FIG. 2, the outlet selection member 12 is illustrated. The outlet selection member 12 is at least partially housed in the outlet selection bore 23 (FIG. 1) and defines a port 30 substantially perpendicular to a longitudinal axis of the outlet selection member 12. A plurality of alternative fluid flow paths are defined by the valve body 11 and the outlet selection member 12. Specifically, as shown in FIGS. 1, 3, and 4, the inlet port 26, the inlet channel 27, the inlet chamber 22, the port 30 defined by the outlet selection member 12, the plurality of outlet channels 28, and the plurality of outlet ports 29 cooperate to form the plurality of alternative fluid flow paths through the valve body 11. In the disclosed embodiment, there are nine outlets forming nine alternative fluid flow paths. As described further below, a desired fluid flow path may be selected from the plurality of alternative fluid flow paths.

Still looking at FIG. 2, in the disclosed embodiment, the outlet selection member 12 is a substantially cylindrical pin with first and second opposing ends 31, 32. A first outlet selection member projection 33 adjacent to the first end 31 of the outlet selection member 12 is attached to or integral with the outlet selection member 12. In the disclosed embodiment, the first outlet selection member projection 33 is a substantially annular cap. Second and third outlet selection member projections 34, 35 adjacent to the second end 32 of the outlet selection member 12 are attached to or integral with the outlet selection member 12. In the disclosed embodiment, the second and third outlet selection member projections 34, 35 are substantially rectangular tabs angularly spaced apart from one another by approximately 90 degrees.

Turning to both FIG. 1 and FIG. 3, a first valve body projection 40 oriented in magnetic proximity to the first outlet selection member projection 33 is attached to or integral with the top surface 13 of the valve body 11. In the disclosed embodiment, the first valve body projection 40 is a collar substantially encircling a port 41 (FIG. 3) defined by the top surface 13 of the valve body 11 for access into the outlet selection bore 23. A second valve body projection 42 oriented in magnetic proximity to the second and third outlet selection member projections 34, 35 is attached to or integral with the bottom surface 14 of the valve body 11. In the disclosed embodiment, the second valve body projection 42 is a substantially rectangular post.

The first outlet selection member projection 33 and the first valve body projection 40 comprise a first magnet assembly 43. Multiple options are available for magnetizing the first magnet assembly 43. For instance, the first magnet assembly 43 could include two electromagnetic components or an electromagnetic component and a non-electromagnetic component. More specifically, both the first outlet selection member projection 33 and the first valve body projection 40 may be electromagnets, or one may be an electromagnet while the other is either a permanent magnet or formed of a magnetically responsive substance such as steel.

The second and third outlet selection member projections 34, 35 together with the second valve body projection 42 comprise a second magnet assembly 44. Multiple options are available for magnetizing the second magnet assembly 44. For instance, the second and third outlet selection member projections 34, 35 could be electromagnets while the second valve body projection 42 is either a permanent magnet, an electromagnet, or formed of a magnetically responsive substance such as steel. Alternatively, the second and third outlet selection member projections 34, 35 could be permanent magnets and/or formed of a magnetically responsive substance such as steel while the second valve body projection 42 includes one or more electromagnets.

As will be appreciated by one of ordinary skill in the art, the electromagnets in the first and second magnet assemblies 43, 44 may be solenoids (not shown) electrically connected to terminals (not shown) attached to, integral with, or separate from the valve body 11. The terminals and in turn, the solenoids, may be powered by a battery (not shown) on a machine (not shown) carrying the valve 10.

The first magnet assembly 43 is configured to enable reciprocation of the outlet selection member 12 within the outlet selection bore 23. Specifically, one or more electromagnets in the first magnet assembly are selectively activated, causing the first outlet selection member projection 33 and the first valve body projection 40 to be either attracted to or repelled by one another, thereby reciprocating the outlet selection member 12 to a selected location within the outlet selection bore 23. The second magnet assembly 44 is configured to enable rotation of the outlet selection member 12 within the outlet selection bore 23. Specifically, one or more electromagnets in the second magnet assembly 44 are selectively activated, causing the second outlet selection member projection 34 and the second valve body projection 42 to be either attracted to or repelled by one another and/or causing the third outlet selection member 35 and the second valve body projection 42 to be either attracted to or repelled by one another, thereby rotating the outlet selection member 12 to a selected location within the outlet selection bore 23. This selective reciprocation and rotation of the outlet selection member 12 within the outlet selection bore 23 enables the user to select a desired fluid flow path from the plurality of alternative fluid flow paths through the valve body 11.

One or more springs 45 such as a torsion spring are installed around the first and/or second ends 31, 32 of the outlet selection member 12. The spring 45 urges the outlet selection member 12 to rotate and/or reciprocate to a default position upon deactivation of the first and/or second magnet assemblies 42, 44. When the outlet selection member 12 of the disclosed embodiment is oriented in the default position, the default outlet channel 25 is the centermost outlet of the plurality of outlets 24 and the second and third outlet selection member projections 34, 35 are approximately equidistant from the second valve body projection 42.

INDUSTRIAL APPLICABILITY

Figure 5:
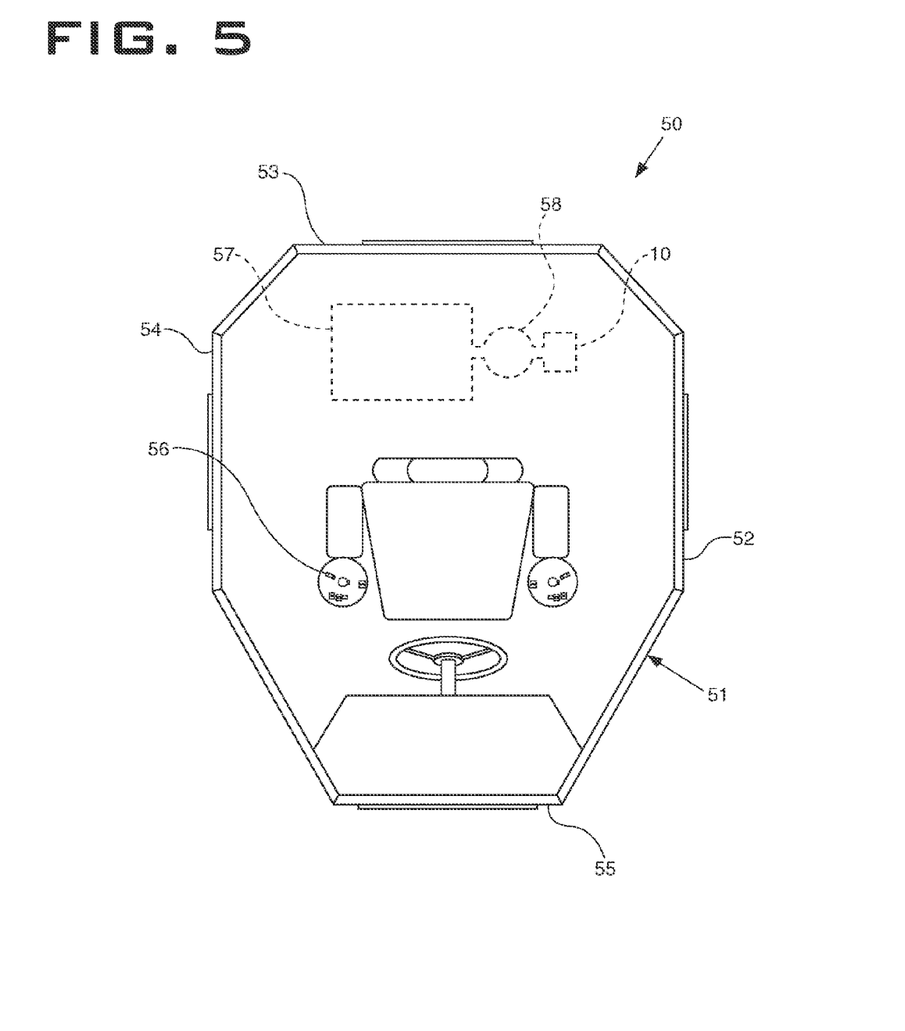
FIG. 5 is a schematic plan view of a machine incorporating aspects of a disclosure.

Referring to FIG. 5, the valve 10 is one component of a washer fluid supply system in a machine 50 that includes an operator cabin 51 and a plurality of work surfaces 52, 53, 54, 55. In addition to the valve 10, the washer fluid supply system includes a washer switch 56 within the operator cabin, a reservoir 57 of washer fluid, and a pump 58 for pumping the washer fluid from the reservoir. The washer switch, the reservoir, and the pump are designed and configured in accordance with the knowledge of one of ordinary skill in the art.

The washer switch is associated with one of the plurality of work surfaces. The association of the washer switch with one of the plurality of work surfaces may be accomplished by implementing any one of a plurality of possible washer switch configurations. There may be multiple washer switches within the operator cabin, each of the multiple washer switches being associated with a single, specific work surface on the machine. For instance, the multiple washer switches may include a first washer switch associated with a front windshield of the machine and a second washer switch associated with a rear windshield of the machine, thereby enabling the operator to cause the washer fluid supply system to direct washer fluid to the front windshield of the machine or the rear windshield of the machine, respectively, as needed or desired. Alternatively, a single washer switch could be included in the operator cabin along with a work surface selector, thereby enabling the operator to actuate the work surface selector to select one of the plurality of work surfaces of the machine for washing and to subsequently actuate the washer switch to cause the washer fluid supply system to direct washer fluid to the selected work surface.

When the washer switch is actuated by the operator relative to the selected work surface, the first magnet assembly 43 and/or the second magnet assembly 44 of the valve 10 are activated to position the outlet selection member 12 such that the port 30 defined by the outlet selection member 12 completes the selected fluid flow path through the valve body 11, i.e., the fluid flow path associated with the selected work surface. More specifically, the first magnet assembly 43 and/or the second magnet assembly 44 rotate and/or reciprocate the outlet selection member 12 in the outlet selection bore 23 such that the port 30 defined by the outlet selection member 12 brings the inlet chamber 22 into fluid communication with the outlet channel 28 of the outlet among the plurality of outlets 24 that, in turn, is in fluid communication with the selected work surface. Alternatively, if the selected work surface is in fluid communication with the default outlet 25 of the plurality of outlets 24, the first and second magnet assemblies 43, 44 either deactivate or refrain from activating, thereby enabling the spring 45 to urge the outlet selection member 12 to the default position in order to bring the inlet chamber 22 into fluid communication with the default outlet 25. The default position of the outlet selection member 12 and the default outlet 25 of the valve 10 may be associated with the most frequently washed work surface of the plurality of work surfaces on the machine, for instance the front windshield of the machine.

Many variations of the disclosed embodiments of the invention may be practiced without departing from the scope of the invention. For example, the valve could be formed of plastic or metal. In addition, the valve body could be substantially spherical or elliptical and/or could define a lesser or greater number of outlets than disclosed. Further, the first and second magnet assemblies could be oriented adjacent to the same end of the outlet selection member, the various structures of the first and second magnet assemblies could be shaped or sized differently than disclosed, and the first and second magnet assemblies could include a greater number of structures than disclosed. For instance, the first magnet assembly could comprise two or more structures attached to or integral with the valve body in place of the first valve body projection and/or the first magnet assembly could comprise two or more structures attached to or integral with the outlet selection member in place of the first outlet selection member projection. In any event, the potential embodiments of the invention disclosed above are provided only as examples and do not abridge the scope of the invention, as the full scope of the invention is defined only by the claims.

What is claimed is:

1. A valve, comprising:
   a valve body defining an inlet and a plurality of outlets, the inlet and the plurality of outlets cooperating to form a plurality of alternative fluid flow paths through the valve body;
   an outlet selection member carried by the valve body and defining a port configured to complete a fluid flow path selected from the plurality of alternative fluid flow paths, the inlet of the valve body being disposed other than in axial alignment with the outlet selection member;
   a first magnet assembly configured to enable reciprocation of the outlet selection member; and
   a second magnet assembly configured to enable rotation of the outlet selection member.

2. A valve according to claim 1, wherein the outlet selection member is a substantially cylindrical pin.

3. A valve according to claim 1, wherein the first magnet assembly and the second magnet assembly each comprise an electromagnet.

4. A valve according to claim 3, wherein the first magnet assembly and the second magnet assembly each further comprise a permanent magnet or steel.

5. A valve, comprising:
   a valve body defining an inlet and a plurality of outlets, the inlet and the plurality of outlets cooperating to form a plurality of alternative fluid flow paths through the valve body, the valve body further defining an outlet selection bore having a longitudinal axis, the inlet having a longitudinal axis, the longitudinal axis of the outlet selection bore being substantially perpendicular to the longitudinal axis of the inlet,
   an outlet selection member carried by the valve body and defining a port configured to complete a fluid flow path selected from the plurality of alternative fluid flow paths;
   a first magnet assembly configured to enable reciprocation of the outlet selection member; and
   a second magnet assembly configured to enable rotation of the outlet selection member.

6. A valve, comprising:
   a valve body defining an inlet and a plurality of outlets, the inlet and the plurality of outlets cooperating to form a plurality of alternative fluid flow paths through the valve body;
   an outlet selection member carried by the valve body and defining a port configured to complete a fluid flow path selected from the plurality of alternative fluid flow paths;
   a first magnet assembly configured to enable reciprocation of the outlet selection member, the first magnet assembly comprising:
      an outlet selection member projection adjacent to an end of the outlet selection member, and
      a valve body projection oriented in magnetic proximity to the outlet selection member projection; and
   a second magnet assembly configured to enable rotation of the outlet selection member.

7. A valve according to claim 6, wherein the outlet selection member projection is a first outlet selection member projection, the end of the outlet selection member is a first end of the outlet selection member, the valve body projection is a first valve body projection, and the second magnet assembly comprises:
   second and third outlet selection member projections adjacent to a second end of the outlet selection member, the second end of the outlet selection member opposing the first end of the outlet selection member, and
   a second valve body projection oriented in magnetic proximity to the second and third outlet selection member projections.

8. A valve, comprising:
   a valve body defining an inlet and a plurality of outlets, the inlet and the plurality of outlets cooperating to form a plurality of alternative fluid flow paths through the valve body;
   an outlet selection member carried by the valve body and defining a port configured to complete a fluid flow path selected from the plurality of alternative fluid flow paths;
   a first magnet assembly configured to enable reciprocation of the outlet selection member;
   a second magnet assembly configured to enable rotation of the outlet selection member; and
   a spring on the outlet selection member, said spring configured to urge the outlet selection member into a default position when the first and second magnet assemblies are not activated.

9. A washer fluid supply system in a machine including an operator cabin and a plurality of work surfaces, said washer fluid supply system comprising:
   a washer switch within the operator cabin, said washer switch associated with one of the plurality of work surfaces;
   a reservoir of washer fluid;
   a pump for pumping the washer fluid from the reservoir;

a valve for directing the washer fluid from the pump to the work surface associated with the washer switch, said valve including:
    a valve body defining an inlet, an inlet chamber, and a plurality of outlets, the inlet, the inlet chamber, and the plurality of outlets cooperating to form a plurality of alternative fluid flow paths through the valve body;
    an outlet selection member carried by the valve body and defining a port configured to complete a fluid flow path selected from the plurality of alternative fluid flow paths, the outlet selection member having an axis and an outer surface, the inlet chamber being partially defined by the outer surface of the outlet selection member, at least a portion of the outer surface defining the inlet chamber being substantially parallel to the axis;
    a first magnet assembly configured to enable reciprocation of the outlet selection member; and
    a second magnet assembly configured to enable rotation of the outlet selection member.

10. A washer fluid supply system according to claim 9, wherein the outlet selection member of the valve is a substantially cylindrical pin.

11. A washer fluid supply system according to claim 9, wherein the first magnet assembly and the second magnet assembly each comprise an electromagnet.

12. A washer fluid supply system according to claim 11, wherein the first magnet assembly and the second magnet assembly each further comprise a permanent magnet or steel.

13. A washer fluid supply system in a machine including an operator cabin and a plurality of work surfaces, said washer fluid supply system comprising:
    a washer switch within the operator cabin, said washer switch associated with one of the plurality of work surfaces;
    a reservoir of washer fluid;
    a pump for pumping the washer fluid from the reservoir;
    a valve for directing the washer fluid from the pump to the work surface associated with the washer switch, said valve including:
        a valve body defining an inlet and a plurality of outlets, the inlet and the plurality of outlets cooperating to form a plurality of alternative fluid flow paths through the valve body, the valve body further defining an outlet selection bore having a longitudinal axis, the inlet having a longitudinal axis, the longitudinal axis of the outlet selection bore being substantially perpendicular to the longitudinal axis of the inlet;
        an outlet selection member carried by the valve body and defining a port configured to complete a fluid flow path selected from the plurality of alternative fluid flow paths;
        a first magnet assembly configured to enable reciprocation of the outlet selection member; and
        a second magnet assembly configured to enable rotation of the outlet selection member.

14. A washer fluid supply system in a machine including an operator cabin and a plurality of work surfaces, said washer fluid supply system comprising:
    a washer switch within the operator cabin, said washer switch associated with one of the plurality of work surfaces;
    a reservoir of washer fluid;
    a pump for pumping the washer fluid from the reservoir;
    a valve for directing the washer fluid from the pump to the work surface associated with the washer switch, said valve including:
        a valve body defining an inlet and a plurality of outlets, the inlet and the plurality of outlets cooperating to form a plurality of alternative fluid flow paths through the valve body;
        an outlet selection member carried by the valve body and defining a port configured to complete a fluid flow path selected from the plurality of alternative fluid flow paths;
        a first magnet assembly configured to enable reciprocation of the outlet selection member, the first magnet assembly comprising:
            an outlet selection member projection adjacent to an end of the outlet selection member, and
            a valve body projection oriented in magnetic proximity to the outlet selection member projection; and
        a second magnet assembly configured to enable rotation of the outlet selection member.

15. A washer fluid supply system according to claim 14, wherein the outlet selection member projection is a first outlet selection member projection, the end of the outlet selection member is a first end of the outlet selection member, the valve body projection is a first valve body projection, and the second magnet assembly comprises:
    second and third outlet selection member projections adjacent to a second end of the outlet selection member, the second end of the outlet selection member opposing the first end of the outlet selection member, and
    a second valve body projection oriented in magnetic proximity to the second and third outlet selection member projections.

16. A washer fluid supply system in a machine including an operator cabin and a plurality of work surfaces, said washer fluid supply system comprising:
    a washer switch within the operator cabin, said washer switch associated with one of the plurality of work surfaces;
    a reservoir of washer fluid;
    a pump for pumping the washer fluid from the reservoir;
    a valve for directing the washer fluid from the pump to the work surface associated with the washer switch, said valve including:
        a valve body defining an inlet and a plurality of outlets, the inlet and the plurality of outlets cooperating to form a plurality of alternative fluid flow paths through the valve body;
        an outlet selection member carried by the valve body and defining a port configured to complete a fluid flow path selected from the plurality of alternative fluid flow paths;
        a first magnet assembly configured to enable reciprocation of the outlet selection member; and
        a second magnet assembly configured to enable rotation of the outlet selection member;
        the outlet selection member of the valve including a spring configured to urge the outlet selection member into a default position when the first and second magnet assemblies of the valve are not activated.

17. A washer fluid supply system according to claim 16, wherein one of the work surfaces of the machine is a front windshield and the default position of the outlet selection member of the valve enables the washer fluid to flow to the valve outlet that directs washer fluid to the front windshield of the machine.

18. A method for operating a valve to direct fluid flow from an inlet defined by the valve to an outlet selected from a plurality of outlets defined by the valve, the method comprising:

providing a valve comprising:
- a valve body defining an inlet and a plurality of outlets, the inlet and the plurality of outlets cooperating to form a plurality of alternative fluid flow paths through the valve body;
- an outlet selection member carried by the valve body and defining a port configured to complete a fluid flow path selected from the plurality of alternative fluid flow paths, the inlet of the valve body being disposed other than in axial alignment with the outlet selection member;
- a first magnet assembly configured to enable reciprocation of the outlet selection member; and
- a second magnet assembly configured to enable rotation of the outlet selection member; and activating at least one of the first magnet assembly and the second magnet assembly to position the outlet selection member such that the port defined by the outlet selection member completes the selected fluid flow path.

19. A method for operating a valve to direct fluid flow from an inlet defined by the valve to an outlet selected from a plurality of outlets defined by the valve, the method comprising:
providing a valve comprising:
- a valve body defining an inlet and a plurality of outlets, the inlet and the plurality of outlets cooperating to form a plurality of alternative fluid flow paths through the valve body;
- an outlet selection member carried by the valve body and defining a port configured to complete a fluid flow path selected from the plurality of alternative fluid flow paths;
- a first magnet assembly configured to enable reciprocation of the outlet selection member, the first magnet assembly comprising:
  - an outlet selection member projection adjacent to an end of the outlet selection member, and
  - a valve body projection oriented in magnetic proximity to the outlet selection member projection; and
- a second magnet assembly configured to enable rotation of the outlet selection member; and activating at least one of the first magnet assembly and the second magnet assembly to position the outlet selection member such that the port defined by the outlet selection member completes the selected fluid flow path.

20. A method according to claim 19, wherein the outlet selection member projection is a first outlet selection member, the end of the outlet selection member is a first end of the outlet selection member, the valve body projection is a first valve body projection, and the second magnet assembly provided in said providing step comprises:
- second and third outlet selection member projections adjacent to a second end of the outlet selection member, the second end of the outlet selection member opposing the first end of the outlet selection member, and
- a second valve body projection oriented in magnetic proximity to the second and third outlet selection member projections.

\* \* \* \* \*